No. 855,004. PATENTED MAY 28, 1907.
L. J. R. HOLST & L. BORSUM.
PHOTOGRAPHIC CAMERA.
APPLICATION FILED APR. 10, 1906.
3 SHEETS—SHEET 2.
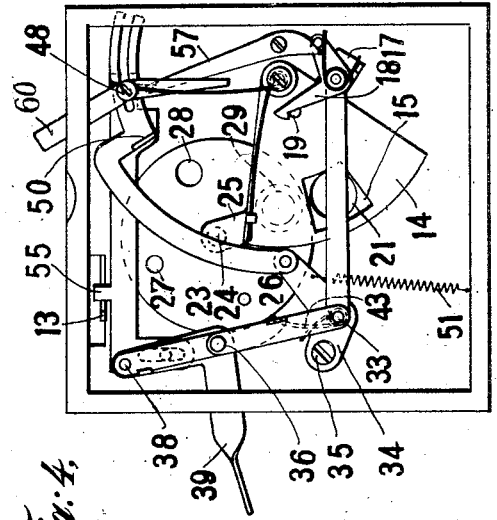
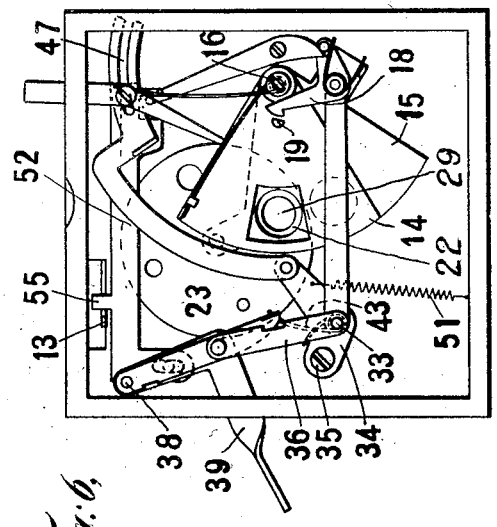
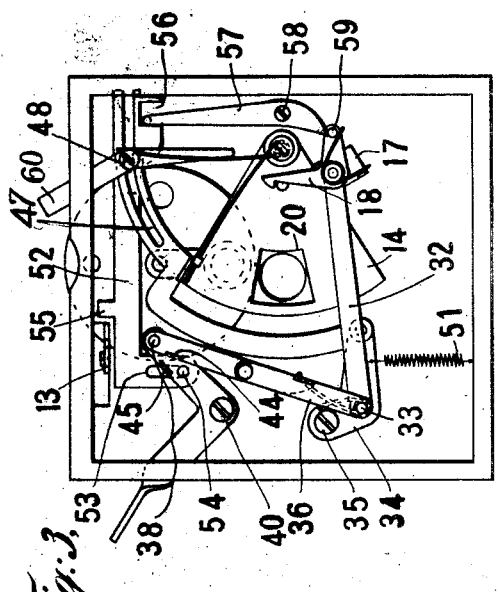
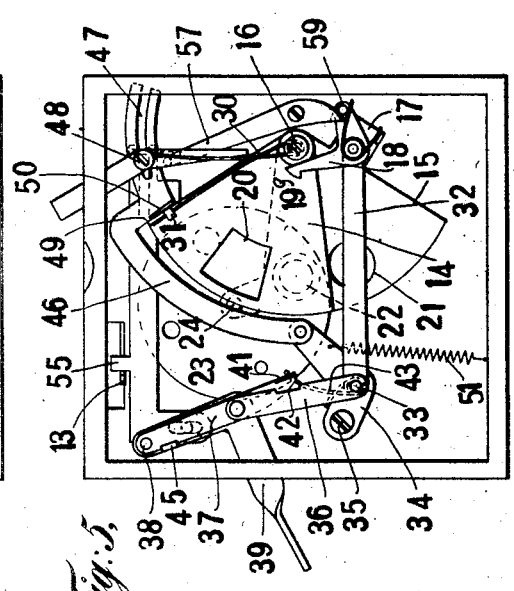
WITNESSES
L. J. R. Holst
Louis Borsum
INVENTORS
BY Edward C. Davidson
ATTORNEY No. 855,004.  PATENTED MAY 28, 1907.
L. J. R. HOLST & L. BORSUM.
PHOTOGRAPHIC CAMERA.
APPLICATION FILED APR. 10, 1906.

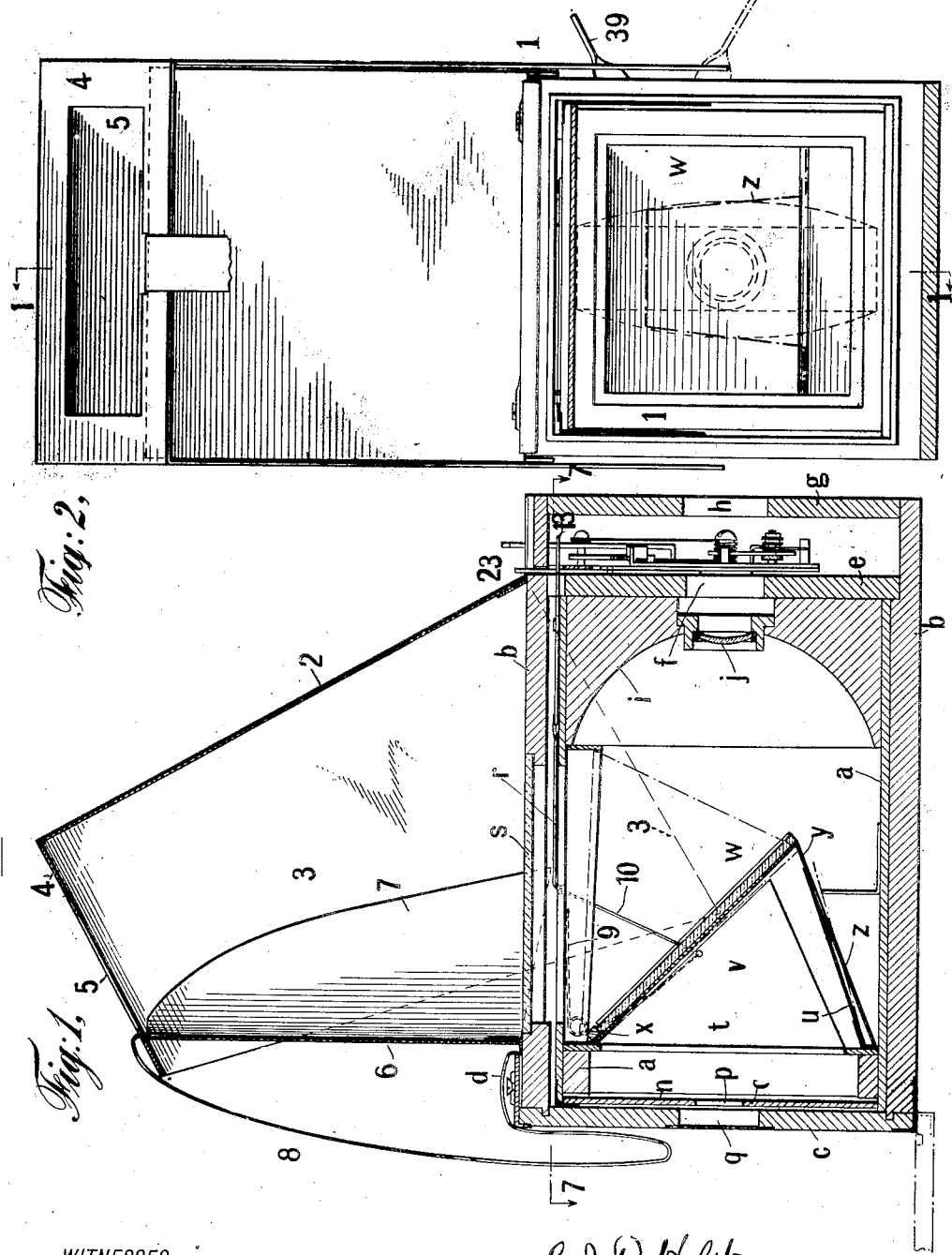

3 SHEETS—SHEET 3.

WITNESSES
Max B. A. Doring.
L. F. Browning.

INVENTORS
L. J. R. Holst
Louis Borsum
BY
Edward C. Davidson
ATTORNEY

UNITED STATES PATENT OFFICE.

LODEWYK JAN RUTGER HOLST, OF NEW YORK, N. Y., AND LOUIS BORSUM, OF PLAINFIELD, NEW JERSEY.

PHOTOGRAPHIC CAMERA.

No. 855,004.   Specification of Letters Patent.   Patented May 28, 1907.

Application filed April 10, 1906. Serial No. 310,975.

*To all whom it may concern:*

Be it known that we, LODEWYK JAN RUTGER HOLST, of the borough of Brooklyn, city and State of New York, and LOUIS BORSUM, of Plainfield, county of Union, State of New Jersey, citizens of the United States of America, have invented certain new and useful Improvements in Photographic Cameras, of which the following is a specification.

This invention relates to that class of cameras in which the image to be photographed is thrown by the objective upon a surface that reflects to the eye of the operator, or upon a visible focusing surface. The most common form of such cameras is that in which a mirror arranged at an angle receives the image and reflects it upwardly to a horizontally disposed focusing ground glass.

The objects of this invention are to improve the construction of the camera body and to combine therewith a lens shutter capable of such manipulation as to permit focusing by the lens or objective and then, immediately following, the taking of the picture, and restoration of the lens opening for focusing after the reflecting surface has been returned to normal position in which the sensitized surface is protected from light by it.

A further feature is that the shutter is constructed to afford both snap shots and time exposures.

Usually in cameras of the type to which this invention relates, focal plane shutters have been employed.

The invention has been shown applied to a style of camera in which is exposed a continuous length of sensitized film and in which the film rolls are carried in front of the focal plane.

The invention further constitutes an improvement upon that style of camera; and is shown in a form which experience has demonstrated to be efficient. Obviously, however, it may be embodied in other forms; that is to say, the structural elements may be varied within the scope of the appended claims by those skilled in the art without departing from this invention.

Figure 8:
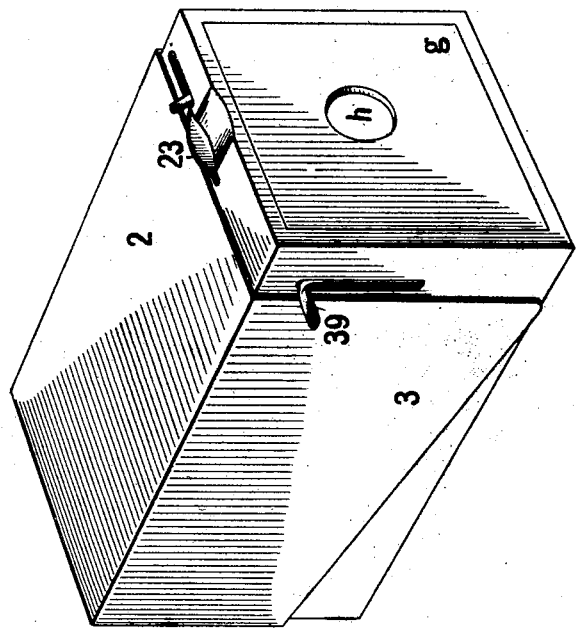
Figure 7:
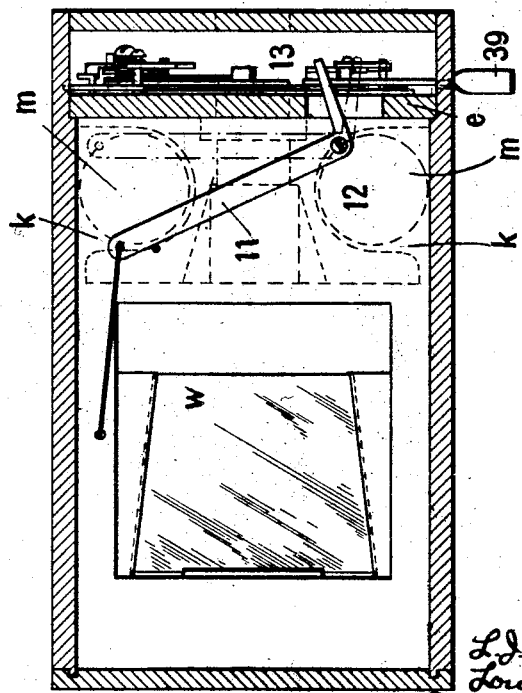

In the accompanying drawings: Figure 1 is a vertical longitudinal section on the line 1, 1, of Fig. 2: Fig. 2, a rear view with the back plate of the box and adjacent interior hinged flap removed: Fig. 3, a detail front elevation with the front plate removed, showing the shutter mechanism in the normal focusing position: Fig. 4, a like view showing the parts in position with the objective covered before the exposure has occurred: Fig. 5, a like view after the exposure has been made and before the shutter actuating lever has been released: Fig. 6, a like view showing the parts adjusted for a time exposure: Fig. 7, a horizontal section on the line 7, 7, of Fig. 1: Fig. 8, a perspective view of the camera.

The camera comprises an inner part or section $a$ fitting and sliding endwise into an outer box or casing $b$ having a door $c$ retained by a latch $d$ at the top and adapted to swing downwardly (Fig. 1) to permit the withdrawal of the inner section $a$. Near the front, the box has a partition $e$ with a central exposure opening $f$ and upon which is mounted the shutter mechanism access to which is afforded by a removable front cover $g$ having an exposure opening $h$. The inner section comprises, at the front, a block $i$ in which is mounted the objective $j$. At the sides of the block are recesses $k$ (dotted lines, Fig. 7) to receive film rolls or cartridges $m$, also indicated by dotted lines. The film passes from the supply roll along the sides of the inner section across the focal plane at $n$, that is to say, just inside of a hinged flap $o$ having an aperture $p$ opposite a ruby glass covered aperture $q$ in the rear door or wall $c$ of the outer casing, from whence the film passes to the winding spool or reel.

The construction described is that of a familiar type of camera one form of which is known as the "Brownie" with the exception that in the ordinary "Brownie", the objective is usually carried by the partition $e$, whereas in the drawing, it is shown as carried by the block $i$ forming part of the inner removable section $a$. The upper wall of the inner section has a focusing opening $r$ of suitable dimensions above which, seated in an opening in the outer case $b$, is a focusing ground glass $s$. In front of the focal plane $n$ there is a triangular box-liked structure or frame comprising an open rear vertical part $t$ an upwardly inclined bottom part $u$ and triangular side pieces $v$. The front of this structure $t$, $u$, $v$, is normally closed by a mirror $w$ hinged at the top as at x and so mounted and arranged that when in normal position, as in Fig. 1, light is prevented from entering the structure $t$, $u$, $v$,—that is to say, not allowed to reach the focal plane in which the sensitized film or other sensitized surface may be standing. To the front edge of the mirror is attached a rearwardly inclined plate $y$ that passes beneath the plate $u$ in close proximity to and in substantial parallelism therewith. This plate $y$ has in it an exposure opening $z$ of suitable dimensions, indicated by the heavy broken lines in Fig. 2; and when the mirror is swung upwardly the pencil of light from the lens passes through the opening $z$ to the focal plane as will be well understood. When the mirror is down, as in Fig. 1, the plate $y$ overlaps the wall or plate $u$ excluding light from the focal plane during the focusing operation. If the lens opening be unobstructed, the image to be photographed is thrown upon the mirror $w$ disposed at an angle of forty-five degrees and is reflected upwardly upon the focusing glass $s$.

To prevent access of light entering through the ground glass to sensitized film passing along the sides of the inner section of the camera, light-excluding flexible curtains 1 pasted, or otherwise applied, to the upper wall of the section $a$ at its side edges extend downwardly (Fig. 2), the film passing between them and the side walls of the section $a$.

It will now be in order to describe the devices by which suitable observation of the image thrown upon the focusing glass is afforded; and then the shutter mechanism which has a novel mode of operation making it particularly applicable to cameras of the type cited at the beginning of this specification and of which that described and shown in the drawings is an illustration.

Hinged to the top of the outer casing, near the front, is a hood consisting of a top plate 2, side plates 3 of appropriate dimensions, which extend down along the sides of the outer casing, and an end plate 4 having in it a suitable observation opening 5. Hinged near the back of the top plate is an independently movable part of the observation hood comprising a plate 6 and side pieces 7 also adapted to fold down upon the top of the camera inside of the hood part 1, 2, 3. Attached at one end to the outer or upper edge of the plate 6 is a tape passing through observation opening 5 and attached at its other end to the top of the outer casing near its rear edge. When folded the plate 6 lies flat upon the outer box and the plate 2 folds down flat upon plate 6.

To adjust the apparatus for focusing the picture, the hood section 2, 3, is raised by means of the tape 8 attached to the inner or secondary part of the hood 6, 7, the parts assuming then the position shown in Fig. 1. The ground glass may now be clearly viewed through the observation opening 5.

The shutter is mounted upon the partition $e$. It is of such character that the lens opening is normally open or unobstructed for focusing. In the initial movement of the shutter, the lens opening is closed, then, by means of devices operated upon by part of the shutter mechanism, the focusing mirror is raised, then the exposure is made. If adjusted for a snap shot exposure, the lens opening after the exposure is closed, and during return of the shutter mechanism to normal position, the mirror is first restored to its normal position and then the lens opening is again exposed for focusing. If the exposure be a time exposure, the operation is the same except that, after the mirror is raised, the lens opening remains unobstructed until the shutter operating lever is released. In either case, means may be provided for affording a variety of stops. A spring 9, shown in dotted lines, Fig. 1, normally tends by its reaction to hold the mirror in normal position to close the front opening of the structure $t$, $u$, $v$. A cord 10 attached to the side of the mirror frame extends through an aperture in the top plate of the inner section of the camera and from thence to one end of an elbow lever 11 (Figs. 1 and 7) pivoted at 12, the shorter end 13 of which projects through a slot at the upper edge of partition $e$.

The shutter proper is composed of two segmental plates one, 14, overlying the other, 15, and both pivoted upon a common axis 16. On a projection 17 from plate 15 is pivoted a spring pressed elbow latch 18 normally engaged with a projection 19 on shutter plate 14 and, as long as the latch and projection are in engagement, the two plates swing together about their axis. The outer plate 14 has in it an opening 20 and the under plate 15 has in it two openings, one, 21, normally co-inciding with the opening 20 in plate 14, and another 22. In normal position, as viewed in Fig. 3, the openings 20, 21 are coincident and opposite the lens opening $f$. The rotatable disk 23, pivoted at 24, in a projection 25 extending from the upper edge of shutter plate 15 has a series of stop openings of different diameter 26, 27, 28, 29. It will be disregarded for the moment since it may or may not be used. A spring 30, applied around the axis or post 16 upon which the two shutter plates are pivoted and bearing at its free end upon a lug 31 on the edge of the outer shutter plate 14, tends by its reaction to throw such outer plate upwardly but is normally prevented from doing so by engagement of stop 19 by latch 18. A link 32 extends from the pivot post of latch 18 to a post or pin 33 on an angular lever 34 pivoted at 35. Applied to the same post 33 is a link 36 pivoted at its free upper end to a link 37 intermediate the ends of the latter. The upper end of link 37 is pivoted at 38 to one arm of a bell-crank shutter operating lever 39 pivoted at 40 and whose other arm projects through a slot in the side of the camera case. The lower end of link 37 has a lateral projection 41 that seats in a notch 42 in the edge of link 36 and is normally pressed thereinto by the reaction of a spring 43. In the opposite edge of link 37 near its upper end is a recess 44 in which is normally seated a projection 45 on the edge of the inner arm of bell-crank lever 39. To the end of angular lever 34 is pivoted a curved arm 46 whose upper end is formed with a curved slot 47 of proper radius that embraces a guide post 48. This arm is offset at 49 so that it may abut against the upper edge of segmental plate 14 and has an upturned edge 50 adapted to bear against the edge of such plate. A spring 51 applied to lever 34 tends normally to hold its free end down and so maintains all the parts in position shown in Fig. 3.

Mounted to slide horizontally adjacent the upper wall of the camera box is a plate 52 slotted at one end to embrace and be guided by post 48, and having at its opposite end a vertically slotted downward projection 53 in the slot of which works a pin 54 on the side of the inner arm of bell crank shutter operating lever 39. A projection 55 from the upper edge of plate 52 is placed to act at the proper time upon the arm 13 of the mirror lifting lever already described: and in the lower edge this plate is formed with a recess 56 into which projects the end of a lever 57 pivoted at 58 and having its lower end extending into operative relation to a pin 59 on the projecting end of elbow latch 18.

The parts being in the normal position shown in Fig. 3 and the picture having been focused upon the ground glass, the operator depresses the end of the shutter operating lever 39, and links 36, 37, act to draw up angular lever 34, the effect of which is to impart an end thrust to link 32 causing both shutter plates 14, 15, to rock downwardly into the position shown in Fig. 4 in which opening 22 in shutter plate 15 is co-incident with the lens opening and is covered by the solid part of plate 14. During this movement projection 55 on plate 52 has reached contact with arm 13 of the mirror lifting lever, and further movement of bell crank lever 39 elevates the mirror to a position substantially parallel with the ground glass. The curved arm 46 has been thrown upwardly, links 36, 37, have been drawn into alinement with the axis 40 of the shutter operating lever and the wall of the recess 56 in plate 52 has moved the lower end of lever 57 into contact with pin 59 on latch 18. The lateral projection 45 at the edge of the inner arm of bell-crank operating lever 39 has, in the position shown in Fig. 4, seated in the recess in the side of link 37. In these positions of the various parts, the projecting end of lever 39 may be still further depressed, link 37 now rocking independently of link 36 so that the lower end of the former swings away from the side of the latter. Such further movement of lever 39 produces, by means of a pinion-and-slot connection 53, 54, a further endwise movement of plate 52, the effect of which is to cause lever 57 to trip latch 18 when the outer shutter plate under the reaction of its spring 30 flies upwardly, in its passage exposing the lens as its opening 20 passes in front of opening 22 in the under plate 15. The exposure having been made, lever 39 is released, and reaction of spring 51 returns all parts to normal position. In this return movement, first the projection 55 moves away from the end 13 of the mirror-lifting lever permitting reaction of spring 9 (Fig. 1) to restore the mirror to its normal lowermost position. This occurs before projection 50 on curved arm 46 has carried the outer shutter plate 14 down and before link 32 has drawn plate 15 up to again expose the lens opening and to re-engage post 19 with latch 18.

The variable stop disk 23 rotatable about axis 24, carried by the under plate 15 has stop openings which coincide when an exposure is made with the lens opening of the camera. When the parts are in normal position as in Fig. 3, the edge of the disk may project slightly for convenience of adjustment. For time exposures a stop lever 60 pivoted upon post 48 may be turned into the position shown in Fig. 6, when, on depression of the shutter operating lever and release of the upper shutter section 14 from its latch 18, the stop lever limits its movement, under the reaction of its spring, to its normal position. Otherwise the operation is as already described, and on release of the shutter operating lever, the parts return automatically to normal positions as in Fig. 3 for the focusing of another picture.

Obviously, the details of construction of the shutter may be varied without departing from the principles of this invention or materially changing the sequence of operations through which the shutter mechanism passes on the movement of its actuating device. Of course, it is immaterial whether the camera be equipped for film rolls or for plates or packs.

The observation hood may be varied by those skilled in the art without departing from its principal characteristic which resides in the use of oppositely folding parts each of which folds respectively toward the hinge of the other and one of which is inclosed within the other when folded.

The objective opening is considered to be the passageway in which the objective is located and through which light passes to the reflecting surface, or to the focal plane. Permitting or preventing such passage of light, or the opening and closing or covering and uncovering, of this opening is effected by the shutter whether it be located in front or in rear of the objective.

We claim as our invention:

1. A photographic camera comprising an outer section, an inner section removably seated therein and formed with receptacles, in front of the focal plane, for the film spools and light excluding side pieces between which and the sides of the inner section, the film travels, an angularly disposed focusing mirror and a focusing glass, above the mirror, in the top of the outer section, combined with an objective, and with a shutter having openings through which focusing and exposure are effected.

2. A photographic camera comprising a reflecting surface normally protecting the focal plane from light and adapted to be moved out of the way for the purpose of making an exposure, an objective by which pictures are focused and taken, combined with a shutter having an opening normally in register with the objective for the purpose of focusing, a shutter actuating device and operative connections between it and the reflecting surface whereby the latter may be moved from and returned to normal position, said shutter comprising means acting initially to close the focusing opening, means for uncovering and covering the objective for making an exposure after the reflecting surface has been raised, and means for restoring the shutter to normal focusing position after the reflecting surface is in normal position.

3. A photographic camera comprising a reflecting surface normally protecting the focal plane from the pencil of light entering through the objective and means for moving the reflecting surface to uncover the focal plane, combined with shutter mechanism having two swinging overlying shutter plates normally locked to move together and having co-incident apertures normally co-incident with the objective opening, means whereby, on the actuation of the shutter to take a picture, the shutter plates are moved to cover the objective opening, means acting after such movement of the shutter plates to move the reflecting surface to uncover the focal plane and means for then tripping the outer plate and means for swinging it so that the objective opening may be uncovered for the taking of a picture when the aperture in such outer plate passes across a picture taking aperture in the inner plate.

4. A photographic camera comprising a structure for normally excluding light from the focal plane consisting of side pieces $v$ and bottom piece $u$, a reflecting surface normally closing the rear opening of such structure against admission of light, hinged at its upper edge and carrying at its lower edge a plate $y$ with an exposure opening $z$ therein normally lying under the plate $u$, whereby when the reflecting surface is swung upwardly the focal plane is exposed to the pencil of light from the objective passing through the exposure opening in the plate $y$.

5. A photographic camera comprising the combination of an angularly disposed hinged reflecting mirror normally seated to prevent passage of light from the objective to the focal plane, a spring whose reaction tends to keep the mirror so seated, a lever for swinging the mirror upwardly and an operative connection between it and the mirror, combined with objective shutter devices comprising overlying shutter plates through openings in which the objective is normally exposed and the under one of which plates has also a picture exposure opening, means whereby the shutter, when actuated for the taking of a picture, first moves the overlying plates so that the objective is covered, means for then acting upon the mirror lifting lever to elevate the mirror and means for then moving the outer shutter plate relative to the inner one to effect an exposure.

6. A photographic camera comprising a reflecting surface normally seated to exclude light from the focal plane, means for moving the surface to expose the focal plane when a picture is to be taken, combined with a shutter comprising overlying shutter plates normally locked to move together, a shutter controlling lever on actuation of which the shutter plates are moved to cover the objective opening and to bring an exposure opening in the underlying plate co-incident to the objective opening, means whereby on further movement of the shutter controlling lever the means for moving the reflecting surface are actuated to move the surface to uncover the focal plane and means whereby on continued movement of the shutter actuating lever the outer shutter plate is tripped and moved so that the aperture therein passes over the exposure aperture in the underlying shutter plate and means whereby on reverse movement of the shutter mechanism toward normal position the reflecting surface is restored to normal position and the shutter plates to normal overlying position with co-incident apertures therein opposite the objective opening.

7. A photographic camera comprising an angularly disposed reflecting mirror normally protecting, but capable of movement to uncover, the focal plane, combined with a shutter comprising normally overlying shutter plates normally locked to move together about a common axis, a swinging arm, a link connection between it and one of the shutter plates, a shutter actuating lever and a jointed link connection between it and said swinging arm, a part moved by the shutter actuating lever, a trip device for disconnecting the two shutter plates and a spring for then automatically swinging the outer plate relatively to the inner one.

8. A camera comprising a reflecting surface normally seated to protect the focal plane from light and movable to permit access of light from the objective to the focal plane, combined with a shutter comprising overlying apertured plates normally latched together to swing as one about a common axis, a pivoted arm, a thrust link between it and one of the shutter plates, a shutter actuating lever and a jointed link connection between it and said swinging arm, a part actuated by the lever and a tripping device controlled by said part to unlatch or disconnect the two shutter plates, the combination being and operating so that on the actuation of the shutter to take a picture first, the objective opening is closed by the swinging of the two shutter plates, second, the reflecting surface is moved to uncover the focal plane and finally the jointed link connection between the swinging arm and shutter actuating lever flexes upon its joint to permit a further movement of the arm and the actuation of the trip device, whereby the outer shutter plate is released from the inner one and swings to carry its aperture past an exposure aperture in the inner plate.

9. A photographic camera comprising a reflecting surface normally protecting the focal plane from the entrance of light through the objective, means for moving the surface to uncover the focal plane when a picture is to be taken, combined with shutter mechanism comprising a shutter actuating lever, a swinging arm, a two-part jointed link connection between the lever and swinging arm, a thrust link connected with the swinging arm, two shutter plates one overlying the other and formed with apertures normally co-incident with the objective opening and the under plate having an independent exposure aperture, a latch normally locking the two plates together, so that they move as one, a connection between one of the plates and said thrust link, a tripping device for tripping the latch connection between the two plates, a part moved by the shutter lever provided with means for moving the reflecting surface to uncover the focal plane and for tripping the latch connecting the two shutter plates, a spring applied to the outer shutter plate for moving it independently of the other one and an arm pivoted to said swinging arm and acting to restore the outer shutter plate to normal position after an exposure, the combination being and operating substantially as described.

In testimony whereof, we have hereunto subscribed our names.

LODEWYK JAN RUTGER HOLST.
LOUIS BORSUM.

Witnesses:
L. F. BROWNING,
EDWARD C. DAVIDSON.